US009524653B1

(12) United States Patent
Whitt

(10) Patent No.: US 9,524,653 B1
(45) Date of Patent: Dec. 20, 2016

(54) MOTIVATIONAL BOARD FOR SUN VISOR

(71) Applicant: Bryan Joseph Whitt, Grand Junction, CO (US)

(72) Inventor: Bryan Joseph Whitt, Grand Junction, CO (US)

(*) Notice: Subject to any disclaimer, the term of this patent is extended or adjusted under 35 U.S.C. 154(b) by 201 days.

(21) Appl. No.: 14/322,195

(22) Filed: Jul. 2, 2014

(51) Int. Cl.
*G09B 19/00* (2006.01)
*G09B 25/00* (2006.01)

(52) U.S. Cl.
CPC .................................... *G09B 19/00* (2013.01)

(58) Field of Classification Search
USPC ............... 434/167, 168, 172, 236, 238, 408, 428,434/430; 40/591, 593; 224/277, 311, 312; 296/97.6, 97.8
See application file for complete search history.

(56) References Cited

U.S. PATENT DOCUMENTS 2,097,419 A * 10/1937 Schmidt ................. B60J 3/0282 224/312
2,211,879 A * 8/1940 Cave ......................... B60R 7/05 224/312
4,781,409 A * 11/1988 Harbison ............... B60J 3/0208 206/81
4,944,971 A * 7/1990 McLaughlin ............. B60R 7/05 150/154
D309,756 S * 8/1990 Lothridge ...................... D20/42
D325,554 S * 4/1992 Min-Jenn ..................... D12/417
5,131,177 A * 7/1992 Sy, Jr. ..................... G09F 3/203 40/591
5,259,657 A * 11/1993 Arendt ................... B60J 3/0208 224/312
5,430,965 A * 7/1995 Lai .......................... G09F 21/04 40/358
5,445,427 A * 8/1995 Vandagriff ............. B60J 3/0208 296/97.11
5,871,251 A * 2/1999 Welling ................. B60J 3/0204 296/37.8
5,887,773 A * 3/1999 Booth ..................... B60R 11/02 224/277
6,298,590 B1 * 10/2001 Levinson ................ G09F 21/04 211/89.01
6,688,027 B2 * 2/2004 Fink .......................... G09F 7/00 206/575
6,971,703 B2 * 12/2005 Sturt ...................... B60J 3/0204 296/97.5
7,044,531 B2 * 5/2006 Schaad .................. B60J 3/0204 296/1.08
7,216,918 B1 * 5/2007 Runfola ................. B60J 3/0204 296/97.11
7,818,907 B1 * 10/2010 Warrington, Jr. ...... B60J 3/0204 296/97.6
8,739,442 B2 * 6/2014 Shape .................. A47G 1/0616 224/312
9,015,973 B2 * 4/2015 Pasternak .............. G09F 21/04 40/373
2004/0094588 A1 * 5/2004 Klein ........................ B60R 7/05 224/312

(Continued)

*Primary Examiner* — Kurt Fernstrom
(74) *Attorney, Agent, or Firm* — Middleton Reutlinger

(57) ABSTRACT

Apparatus and methods relating to a motivational display device for a visor, such as the sun visor of a vehicle, are described herein. The motivational display device includes a casing for attaching to the visor, wherein the casing retains a motivational message board to which any of a variety of motivational messages may be affixed.

20 Claims, 5 Drawing Sheets

(56) References Cited

U.S. PATENT DOCUMENTS

| | | | | |
|---|---|---|---|---|
| 2005/0046223 | A1* | 3/2005 | Virts | B60J 3/0208 296/97.6 |
| 2005/0152142 | A1* | 7/2005 | Traynor | A01K 11/00 362/249.01 |
| 2006/0113818 | A1* | 6/2006 | Ferguson | B60J 3/0208 296/97.6 |
| 2009/0266855 | A1* | 10/2009 | Stephens | B60R 7/05 224/312 |
| 2010/0219655 | A1* | 9/2010 | Rymer, Jr. | B60J 3/0208 296/97.8 |

* cited by examiner

MOTIVATIONAL BOARD FOR SUN VISOR

TECHNICAL FIELD

Generally, a display board for displaying messages is taught. More particularly, a display board with a casing that may be mounted to a vehicle sun visor is taught.

BACKGROUND

Reading or viewing positive messages can have a positive impact on a person's psychological state. For example, motivational messages may be viewed or read to encourage or motivate the viewer to think positively or to take action. However, such motivational or psychological messages are not always readily available.

The relative lack of availability of such messages may be particularly noticeable when a person is travelling. People frequently spend a significant amount of time in their vehicles, for example, to commute to and from work on a daily basis. Furthermore, individuals may be alone or with relatively few people while in their vehicle (or someone else's vehicle). Such solitude or relative solitude may provide a good time to prepare for that day's tasks and maximize personal effectiveness. One way of preparing for a day is to consider one's attitude and try to place one's self in a positive state of mind.

Thus, there is a need in the art for overcoming deficiencies in known systems and methods of motivating people each day.

The information included in this Background section of the specification, including any references cited herein and any description or discussion thereof, is included for technical reference purposes only and is not to be regarded subject matter by which the scope of any embodiment or claim is to be bound.

SUMMARY

The present disclosure is directed toward methods and apparatus for a message board that may display motivational messages, which message board may be mounted to the sun visor of a vehicle. The message board may be inserted into a casing and the casing may attach to the sun visor.

Generally, in one aspect, a display device for a sun visor is provided. The display device includes a motivational message board having a predetermined size based on the sun visor, and the motivational message board has a front surface and a rear surface. The front surface has a viewable area to which a plurality of motivational images may be selectively and/or removably attached. A casing is also provided for securably retaining the motivational message board. The casing has a viewing window through which the viewable area of the motivational message board may be viewed when the motivational message board is securably retained in the casing. The display device also includes at least one attachment member that is connected to the casing and/or the motivational message board, with the attachment member removably attachable to the sun visor.

Optionally, in various embodiments, the casing may include a rear opening through which the motivational message board may be inserted into and/or removed from the casing. The rear opening, if included, may be closable and openable. If closable, the rear opening may be securely closable. The casing may include a rear casing member disposable over at least a portion of the rear surface of the motivational message board and, if so, may also include a backing member that may be interposed between the rear surface of the motivational message board and the rear casing member. The attachment member(s), if included, may further include a first strap and a second strap that are attachable to one another to wrap around the sun visor. A second or subsequent attachment member may also be included, with the attachment members disposed near opposite ends of the casing. The attachment member may include a stretchable strap for affixing the casing to the sun visor. The casing may include a frame disposed over a portion of the front surface of the motivational board near an outer perimeter of the motivational message board, with the frame substantially defining the viewing window.

Generally, in another aspect, a sun visor display device is provided having a motivational message board, a plurality of motivational images, a casing, and at least one attachment member. The motivational message board has a predetermined size based on the sun visor, and the motivational message board has a front surface, a rear surface, and an outer perimeter. The motivational images are selectively and removably attachable to the motivational message board. The casing securably retains the motivational message board. The casing has a frame member positionable over the front surface of the motivational message board and adjacent the outer perimeter. The frame member substantially defines a viewing window through which at least a viewable area of the motivational message board is viewable. The attachment member(s) are connected to the casing and/or the motivational message board, with the attachment member(s) removably attachable to the sun visor.

Optionally, in various embodiments, the casing includes a rear casing member that may be disposed over at least a portion of the rear surface of the motivational message board. The rear casing member, if included, may be a substantially sheet or sheet-like material. The casing may include a rear opening through which the motivational message board may be inserted and/or removed from the casing. A backing member may be included that is interposable between the rear surface of the motivational message board and the rear casing member. The attachment member(s) may include a first strap and a second strap that are removably attachable to one another and wrap around the sun visor. A second or subsequent attachment member(s) may be included, with the attachment member(s) disposed near opposite ends of the casing. At least one of the attachment member(s) may include a stretchable strap affixable to the casing. The viewable area may be substantially covered by a substantially transparent screen.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of any present embodiment is provided in the following written description of various embodiments, illustrated in the accompanying drawings, and defined in the appended claims.

BRIEF DESCRIPTION OF THE DRAWINGS

In the drawings, like reference characters generally refer to the same parts throughout the different views. Also, the drawings are not necessarily to scale, and emphasis instead is generally placed upon illustrating the principles of the embodiments depicted.

DETAILED DESCRIPTION

Figure 1:
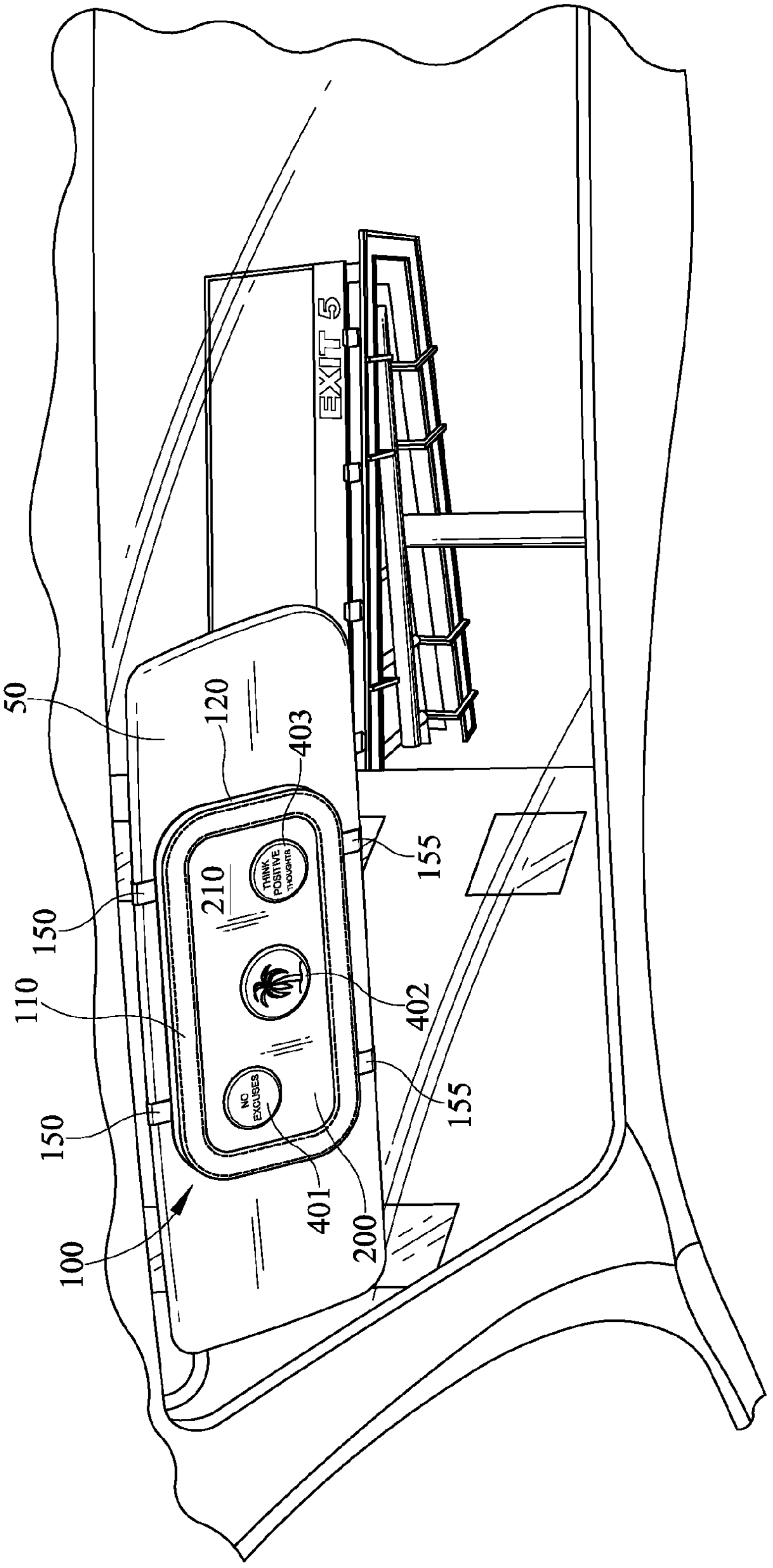
FIG. 1 is a perspective view from the interior of an exemplary vehicle illustrating an embodiment of a motivational board and casing for a sun visor.

It is to be understood that the embodiments are not limited in their application to the details of construction and the arrangement of components set forth in the following description or illustrated in the drawings. Other embodiments are possible and may be practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected" and "coupled" and variations thereof herein are used broadly and encompass direct and indirect connections and couplings. In addition, the terms "connected" and "coupled" and variations thereof are not restricted to physical or mechanical connections or couplings.

Figure 2:
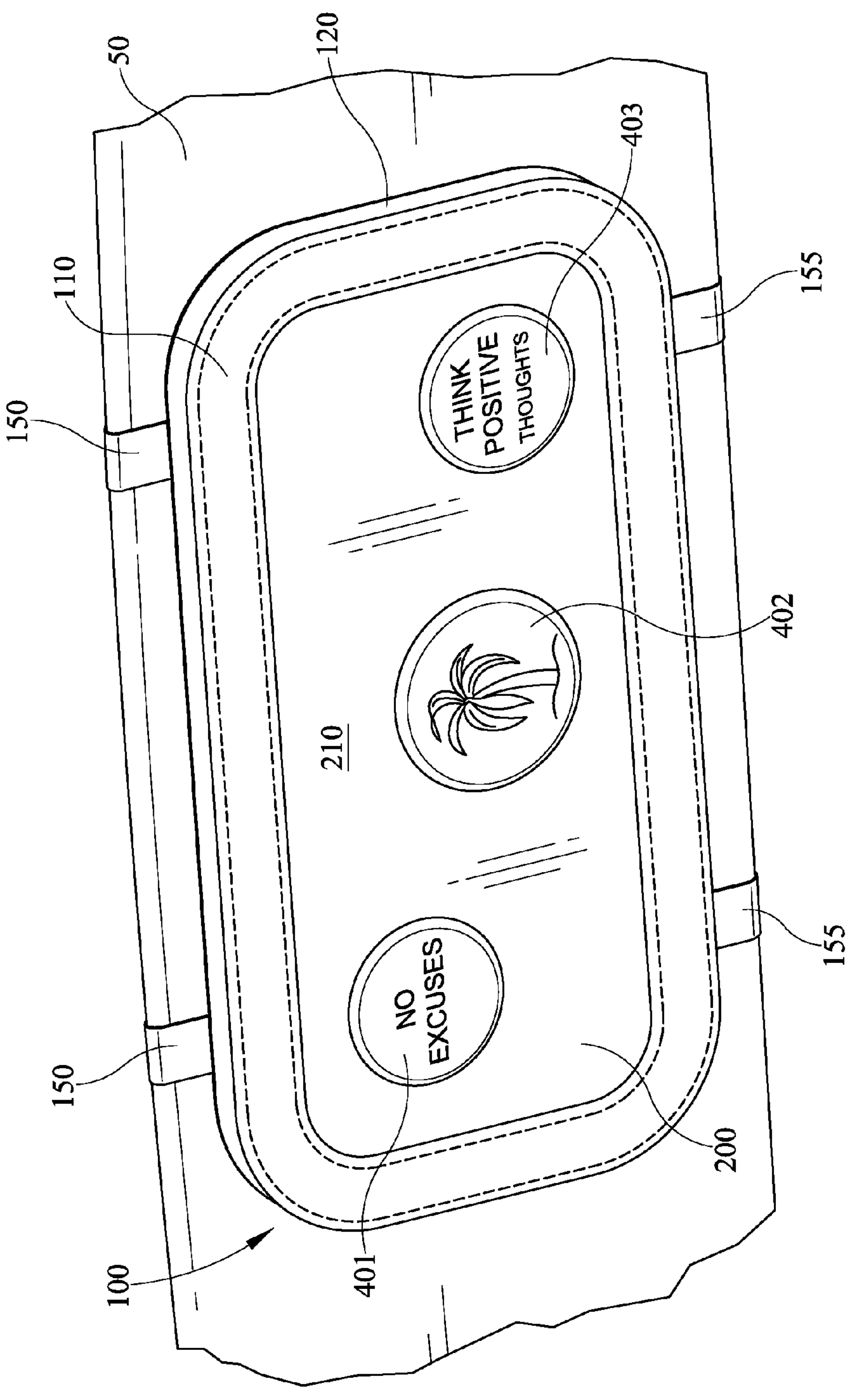
FIG. 2 is a perspective view of the motivational board for a sun visor of FIG. 1, showing the motivational board and casing in more detail.

Referring initially to FIGS. 1 and 2, an embodiment of a motivational display device 100 is illustrated as it may be mounted on an exemplary visor 50 of, for example, a car, vehicle, automobile, boat, airplane, helicopter, or any other mode of transportation or any combination thereof. In some embodiments, visor 50 may be a hinged, swinging, and/or movable sun shade or visor, such as is shown in FIGS. 1 and 2, although it is understood that visor 50 is not so limited. Motivational display device 100 may include a motivational message board 200, which may have a viewing or viewable area 210, and/or a casing 120, which may include a frame 110. Viewable area 210 may be a front surface of motivational message board 200, or a portion thereof, and/or may be at least partially retained in casing 120 by overlapping frame 110, which may obscure from view a portion of the front surface of motivational message board 200 while leaving viewable area 210 substantially visible. Frame 110 may define a perimeter around a viewing window through which viewable area 210 may be seen. In some embodiments, viewable area 210 may be covered by a transparent screen such as a clear plastic sheet, for example, to enclose and/or protect viewable area 210 and/or anything displayed thereon while allowing viewing of viewable area 210.

One or more images, such as a first motivational image 401, a second motivational image 402, and/or a third motivational image 403 may be affixed, connected, and/or connected to viewable area 210. In some embodiments, motivational message board 200 may have magnetic properties and/or any or all of first motivational image 401, second motivational image 402, and third motivational image 403 may include magnets and/or magnetic components. In these or other embodiments, first motivational image 401, second motivational image 402, and/or third motivational image 403 may be magnetically and/or removably affixed, connected, and/or attached to viewable area 210. Removable attachment to viewable area 210 may allow versatility and/or interchangeability so that, for example, any of a variety of different motivational images (e.g., first motivational image 401, second motivational image 402, and/or third motivational image 403), or any combination thereof, may be displayed at a given time. For example, a user may find a given motivational image or group of motivational images particularly helpful on a given day or under given circumstances, while finding a different motivational image or group of motivational images particularly helpful on a different day or under different circumstances, and thus may find it helpful to be able to easily interchange the motivational images accordingly.

The exemplary embodiment of first motivational image 401 shown in FIGS. 1 and 2 is a substantially circular magnet that reads "NO EXCUSES" and is positioned in the upper left corner of viewable area 210. It is understood that first motivational image 401 as shown is merely exemplary, and that first motivational image 401 may have any of a variety of shapes, including, but not limited to, round, circular, triangular, rectangular, square, polygonal, symmetric, asymmetric, freeform, or any other shape or any combination thereof. Similarly, the phrase "NO EXCUSES" that appears on first motivational image 401 is merely exemplary. Any of a variety of phrases, pictures, icons, images, colors, or any visual reference or any combination thereof may appear on first motivational image 401 instead of or in addition to that which is shown in FIGS. 1 and 2, which provide attitude enhancing motivational positivity. Moreover, the positioning of first motivational image 401 in the upper left corner of viewable area 210 is merely exemplary. First motivational image 401 may be positioned virtually anywhere on viewable area 210 (or elsewhere if desired) and, indeed, first motivational image 401 may be magnetic and/or removably affixed, attached, and/or connected to viewable area 210 (or elsewhere) so that a user may interchange it and/or position it as he or she sees fit.

The exemplary embodiment of second motivational image 402 shown in FIGS. 1 and 2 is a substantially circular magnet that depicts a palm tree and is positioned near the middle of viewable area 210. It is understood that second motivational image 402 as shown is merely exemplary, and that second motivational image 402 may have any of a variety of shapes, including, but not limited to, round, circular, triangular, rectangular, square, polygonal, symmetric, asymmetric, freeform, or any other shape or any combination thereof. Similarly, the image of a palm tree that appears on second motivational image 402 is merely exemplary. Any of a variety of phrases, pictures, icons, images, colors, or any visual reference or any combination thereof may appear on second motivational image 402 instead of or in addition to that which is shown in FIGS. 1 and 2, which provide attitude enhancing motivational positivity. Moreover, the positioning of second motivational image 402 near the middle of viewable area 210 is merely exemplary. Second motivational image 402 may be positioned virtually anywhere on viewable area 210 (or elsewhere if desired) and, indeed, second motivational image 402 may be magnetic and/or removably affixed, attached, and/or connected to viewable area 210 (or elsewhere) so that a user may interchange it and/or position it as he or she sees fit.

The exemplary embodiment of third motivational image 403 shown in FIGS. 1 and 2 is a substantially circular magnet that reads "THINK POSITIVE THOUGHTS" and is positioned in the lower right corner of viewable area 210. It is understood that third motivational image 403 as shown is merely exemplary, and that third motivational image 403 may have any of a variety of shapes, including, but not limited to, round, circular, triangular, rectangular, square, polygonal, symmetric, asymmetric, freeform, or any other shape or any combination thereof. Similarly, the phrase "THINK POSITIVE THOUGHTS" that appears on third motivational image 403 is merely exemplary. Any of a variety of phrases, pictures, icons, images, colors, or any visual reference or any combination thereof may appear on third motivational image 403 instead of or in addition to that which is shown in FIGS. 1 and 2, which provide attitude enhancing motivational positivity. Moreover, the positioning of third motivational image 403 in the lower right corner of viewable area 210 is merely exemplary. Third motivational image 403 may be positioned virtually anywhere on viewable area 210 (or elsewhere if desired) and, indeed, third motivational image 403 may be magnetic and/or removably affixed, attached, and/or connected to viewable area 210 (or elsewhere) so that a user may interchange it and/or position it as he or she sees fit.

Any or all of first motivational image 401, second motivational image 402, third motivational image 403, and any other motivational image may be procured and/or selected by the user. For example, a magnetic sheet may be provided bearing a variety of motivational images, phrases, etc., which a user may, for example, cut into individual image-bearing magnets. These individual magnets may provide a pool of image-bearing magnets. Continuing this example, the user may then select magnets from the pool of magnets for display in viewable area 210 as he or she sees fit. For example, a user that wishes to remind herself or himself to not make excuses and to also encourage themselves toward a happy or positive frame of mind may select "NO EXCUSES" for first motivational image 401, a palm tree for second motivational image 402, and/or "THINK POSITIVE THOUGHTS" for third motivational image 403, and/or may display them in the exemplary illustration shown in FIGS. 1 and 2.

It is understood that, although shown in FIGS. 1 and 2 and described above as being magnetically attachable, any or all of first motivational image 401, second motivational image 402, third motivational image 403, and any other visual reference may be attachable, affixable, and/or connectable to viewable area 210 of motivational message board 200, which itself may or may not be magnetic. Any of a variety of attachment mechanisms may be used to attach, affix, and/or connect any or all of first motivational image 401, second motivational image 402, and third motivational image 403 to motivational message board 200, including, but not limited to, magnetics, hook-and-loop style fasteners, static cling, snaps, buttons, adhesives (e.g., images may be on stickers), gluing, bonding, mechanically attaching, and/or any other attachment mechanism or any combination thereof. Thus, none of first motivational image 401, second motivational image 402, third motivational image 403, and any other visual reference or image should be limited to magnetically attaching, affixing, and/or connecting to viewable area 210 and/or to motivational message board 200.

Figure 3:
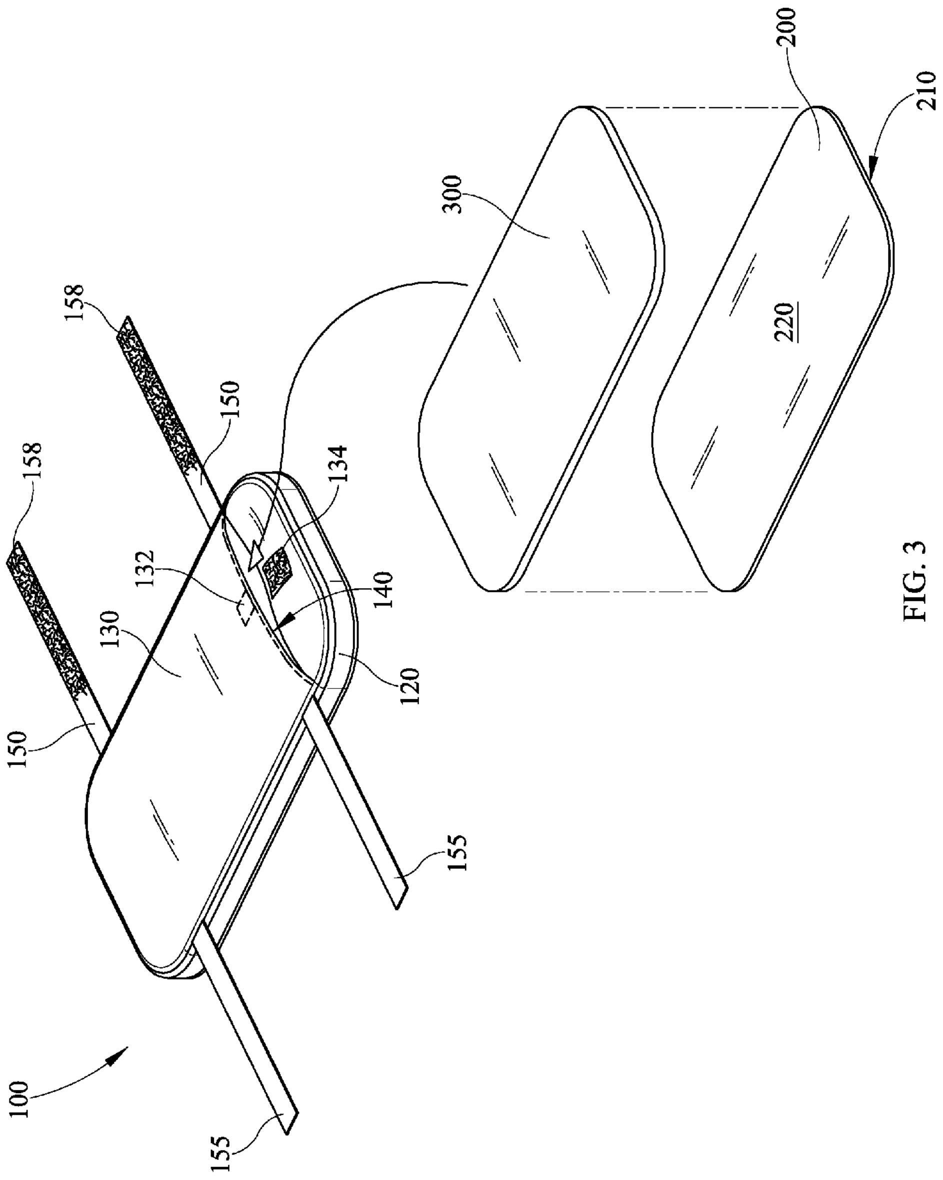
FIG. 3 is an exploded assembly view of the motivational board and casing of FIGS. 1 and 2.

Casing 120 may include and/or have connected thereto one or more attachment members, which if included, may be used to attach, affix, and/or connect casing 120 and/or motivational message board 200 to visor 50. For example, the attachment members may include one or more first straps 150 and/or one or more second straps 155. In such embodiments, first strap(s) 150 and/or second strap(s) 155 may extend outwardly from casing 120, may be wrapped around visor 50, and/or may be fastened together (such as with hook-and-loop or other type fasteners 158 as shown in FIG. 3) to, for example, form a loop around visor 50 for attaching, affixing, and/or connecting casing 120 to visor 50. In some embodiments, first strap(s) 150 and/or second strap(s) 155 may include a substantially stretchable band, such as an elastic strap for example, and each may be a substantially one piece band (see FIG. 4). If first strap(s) 150 and/or second strap(s) 155 are stretchable and/or include elastic, in some embodiments either or both may be stretched by hand, placed around visor 50, and released to constrict around visor 50, thereby securing and/or attaching casing 120 to visor 50.

Any or all first straps 150 and/or any or all second straps 155 may be selected independently of any other strap or attachment mechanism. For example, one first strap 150 and one second strap 155 may form or include an elastic band, while a second first strap 150 and a second second strap 155 may be separate but attachable by, for example, a hook-and-loop style fastener (e.g., using attachment portion 158 shown in FIG. 3). It is understood that first strap 150 and/or second strap 155 is/are not required to extend all the way around visor 50, as some embodiments of first strap 150 and/or second strap 155 may extend only partially around visor 50 (e.g., substantially C-shaped and/or bendable or deformable arms, brackets, clips, etc.) if first strap 150 and/or second strap 155 is included. It is further understood that, although described above as including one or more straps, use of straps is merely an exemplary method or mechanism illustrating how casing 120 may be attached, connected, affixed, and/or secured to visor 50. It is yet further understood that any of a variety of attachment mechanisms or methods may be used instead of, or in addition to, use of straps, such as for example, use of hook-and-loop fasteners, magnets, adhesives, mechanical fasteners, or any other type of fastener or attachment mechanism or method or any combination thereof. Further still, it is understood that, if straps are used, they are not limited to the separate but attachable forms or stretchable forms described above, and that any of a variety of attachment mechanisms may be used instead of or in addition to the embodiments of the straps discussed herein.

Referring now to FIG. 3, various components of motivational display device 100 are illustrated. Motivational message board 200 may have a rear surface 220 opposite the front surface or viewable area 210. In some embodiments, a backing member 300 may be included and, if so, may be adjacent and/or attached to rear surface 220 of motivational message board 200. If included, backing member 300 may be used, for example, to provide additional structural rigidity to motivational display device 100, although it is understood that backing member 300 may be used for any of a variety of reasons instead of or in addition to adding structural rigidity. Backing member 300 may be substantially unattached to motivational message board 200. However, in some embodiments, backing member 300 and motivational message board 200 may be attached, affixed, connected, and/or secured together by any of a variety of attachment methods or mechanisms. For example, backing member 300 may be glued, adhered, fused, bonded, welded, attached by hook-and-loop style fastener(s), attached by mechanical and/or electrical fasteners, and or attached by any of a variety of other attachment mechanisms or methods or any combination thereof, to motivational message board 200 and/or to rear surface 220. In some embodiments, attaching backing member 300 to motivational message board 200 may facilitate insertion of both into casing 120, for example, via rear opening 140. It is understood that backing member 300 is optional and, in some embodiments, motivational display device 100 may be formed or used without backing member 300, or that backing member 300 and motivational message board 200 may be formed integrally and/or as a unit.

Casing 120 may include a rear casing member 130, which may be used, for example, to help retain motivational message board 200 and/or backing member 300 in casing 120. Casing 120 and/or rear casing member 130 may include a rear opening 140 through which motivational message board 200 and/or backing member 300 may be inserted into casing 120. Casing 120 and/or rear casing member 130 may include a closing mechanism to secure motivational message board 200 and/or backing member 300 within casing 120 after insertion into casing 120. For example, rear casing member 130 may have affixed thereto, on either side of rear opening 140, a first attachment area 132 and/or a second attachment area 134, which may be attached to one another to at least partially close rear opening 140. If included, rear opening 140 may be located near one end or side of casing 120, which may facilitate insertion and/or removal of motivational message board 200 and/or backing member 300 from casing 120. It is understood that rear opening 140, if included, may be located virtually anywhere on casing 120 and/or rear casing member 130. It is further understood that, if a rear opening 140 is included, more than one rear opening 140 may be included, such as, for example, having one at each end of casing 120. To facilitate insertion and/or removal of motivational message board 200 and/or backing member 300, rear casing member 130 may be substantially sheet like and/or flexible, although it is not required to be so.

Any of a variety of attachment mechanisms may be used to close rear opening 140, such as, for example, magnetics, hook-and-loop style fasteners, static cling, snaps, buttons, adhesives, gluing, bonding, mechanically attaching, and/or any other attachment mechanism or any combination thereof. It is understood that a closing mechanism is not required to close rear opening 140. For example, rear opening 140 may be substantially slot-like, and/or have overlapping flaps, but be substantially without any additional attachment mechanism, in some embodiments.

In some embodiments, motivational display device 100*a* or any portion thereof (e.g., frame 100 and/or casing 120), and/or motivational display device 100 of FIGS. 1-3 or any portion thereof, may be flexible. Such flexibility, if included, may allow positioning of motivational message board 200 through the front or frame 110. For example, frame 110 and/or casing 120 may be discontinuous to ease insertion through the front or frame 110 but stiff enough to retain motivational message board 200 in position.

Figure 4:
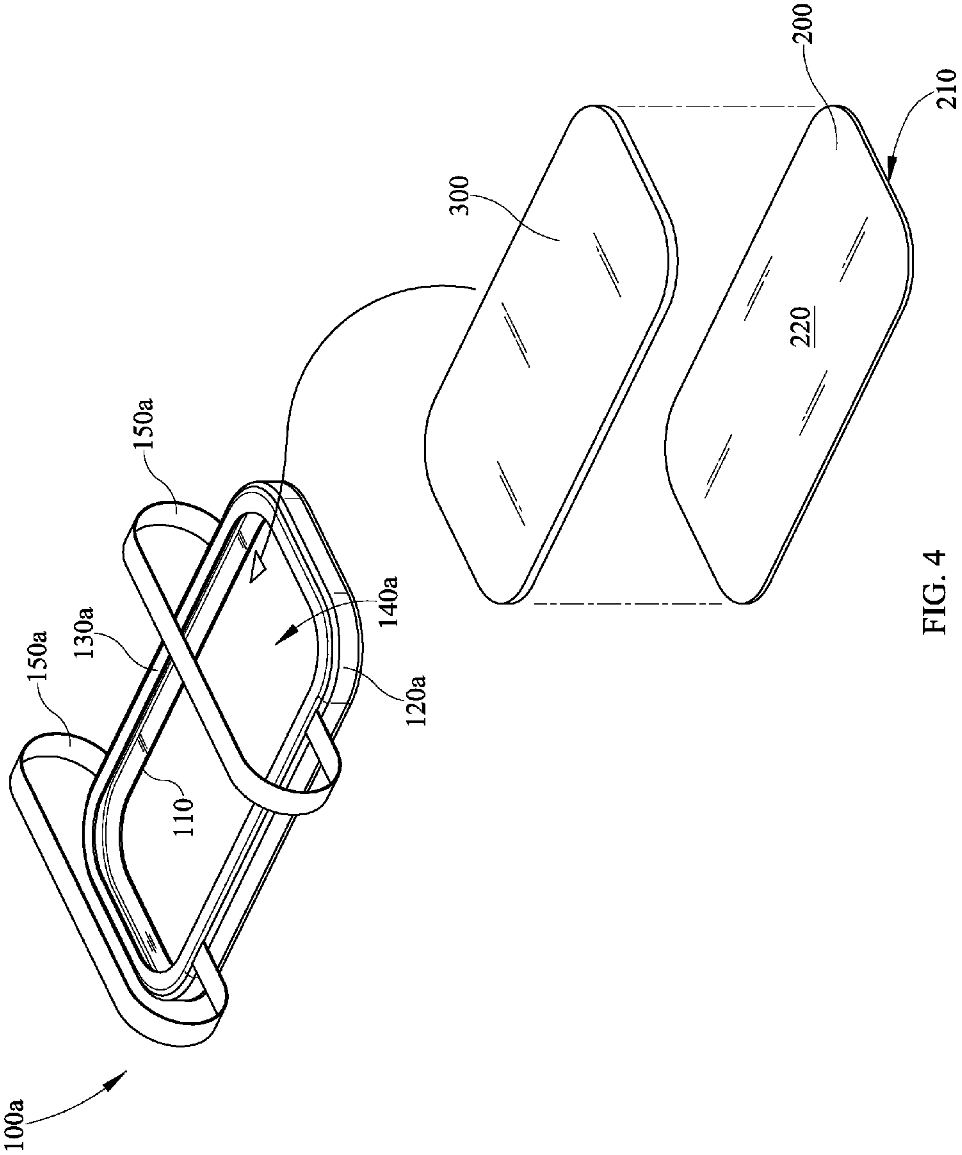
FIG. 4 is an exploded assembly view of an alternate embodiment of a motivational board and casing.

FIG. 4 depicts an alternative embodiment of a motivational display device 100*a* having a casing 120*a*, a rear casing member 130*a*, and attachment straps 150*a*. In this embodiment, rear casing member 130*a* may resemble frame 110 located on the opposite side of casing 120 (i.e. substantially defining a substantially open area, instead of covering most or all of the adjacent surface of motivational message board 200 and/or backing member 300). Such embodiments may form a bumper style casing in which only a portion of the front surface and rear surface of motivational message board 200 and/or backing member 300 are covered by casing 120 (which may include frame 110, but frame 110 could also be separate from casing 120). For example, such a bumper style casing may be stretchable and/or flexible to allow insertion and/or removal of motivational message board 200 and/or backing member 300. A bumper style casing may form a substantially U-shaped channel around the perimeter(s) of motivational message board 200 and/or backing member 300. Such a channel, if included, could further include slits, cuts, and/or discontinuities that may allow easy insertion through the front or frame 110 but stiff enough to retain motivational message board 200 in position.

In bumper style embodiments, attachment straps 150*a* (or attachment members 150, 155 shown in FIG. 3) may attach to casing 120*a* and/or may attach or connect to motivational message board 200 and/or backing member 300. Attachment straps 150*a* may be any of a variety of attachment mechanisms for attaching casing 120*a* to a visor (e.g., visor 50). For example, as shown in FIG. 4, each attachment strap 150*a* may be substantially a one-piece strap that may be stretchable and/or elastic to facilitate attachment to visor 50. It is understood that attachment members 150, 155 or any portion thereof (e.g., attachment portion 158), as shown in FIG. 3 for example, may be used instead of or in addition to attachment strap(s) 150*a* when using a bumper style casing 120*a*. In bumper style or other embodiments, rear opening 140*a* may be substantially larger (e.g., resembling a window instead of a slot similar to rear opening 140 shown in FIG. 3) than in embodiments in which rear opening 140 is located in sheet-like rear casing member 130 as shown in FIG. 3.

Figure 5:
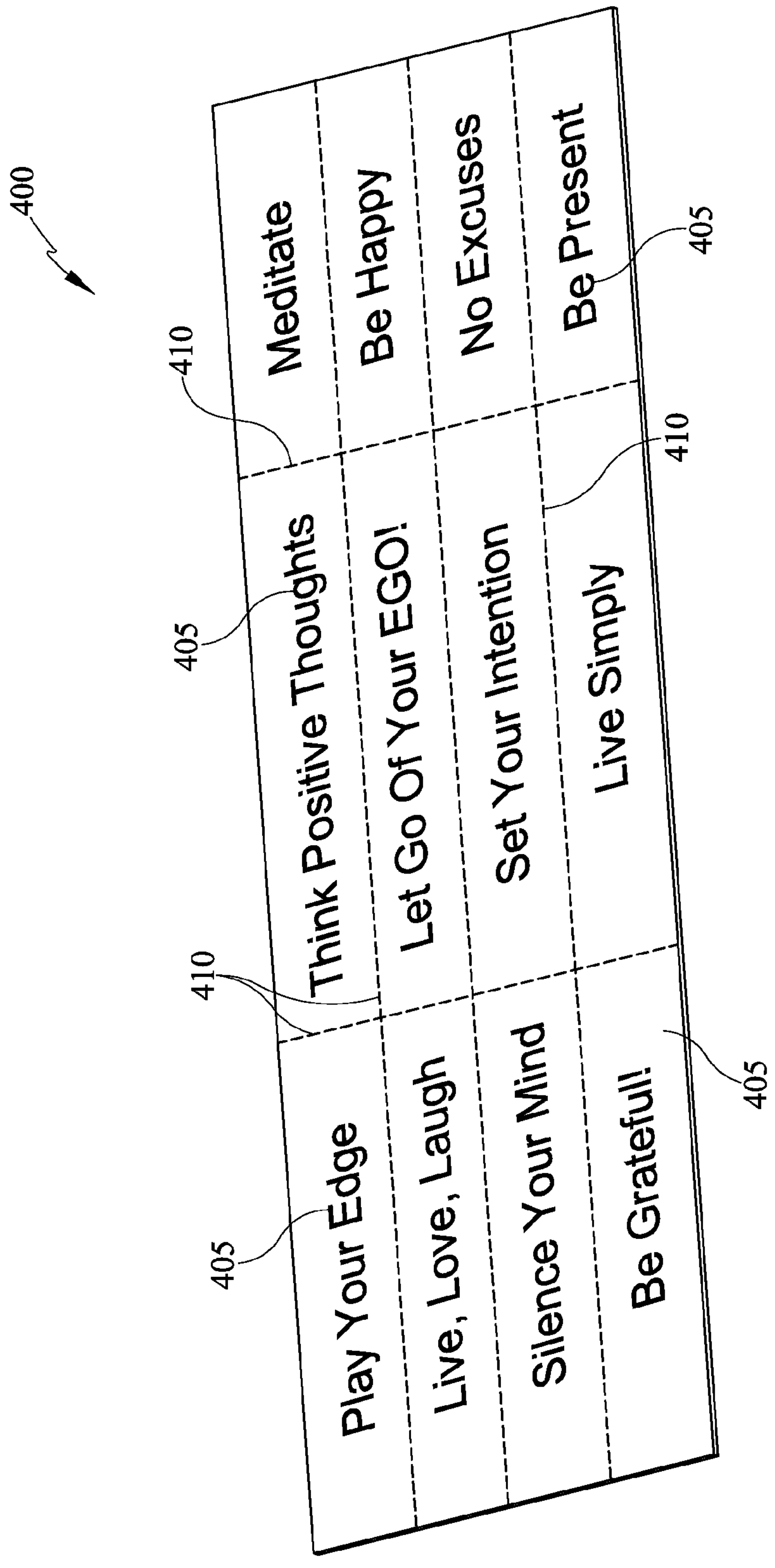
FIG. 5 is a perspective view of a sheet having motivational messages.

FIG. 5 illustrates an embodiment of a sheet 400 that includes a plurality of motivational messages, each shown in a separate cell 405. Each cell 405 may be separated from the other cells 405 by one or more separation lines 410. Separation lines 410 may be scored or perforated, for example, to facilitate separation of one cell 405 from other cells 405. Use of sheet 400 having a plurality of cells 405 may facilitate printing or otherwise providing a plurality of motivational messages for selection by a user. Each cell or message therein may be applied to motivational message board 200. For example, sheet 400 may be magnetic so that one or more cells 405 may be applied to a magnetic motivational message board 200 (e.g. resembling first motivational image 401, second motivational image 402, and/or third motivational image 403). In some embodiments, cells 405 and/or sheet 400 may provide stickers and/or images or icons that may be applied to a magnetic and/or attachable device, which may be applied to motivational message board 200.

Any or all of casing 120, motivational message board 200, and/or backing member 300 may take any of a variety of shapes and/or may be shaped or formed independently of any other. For example, motivational message board 200 and backing member 300 are shown as substantially rectangular in shape and having rounded corners. In this example, casing 120 may substantially be rectangular with rounded corners and/or may match the shape of motivational message board 200 and/or backing member 300. Casing 120 may be slightly larger than either or both of motivational message board 200 and backing member 300, for example, to accommodate insertion therein. Alternatively, casing 120 may be substantially the same size or smaller than motivational message board 200 and/or backing member 300, for example, to form a friction or interference fit therewith. Moreover, casing 120 may be stretchable to accommodate and/or further secure (e.g., by compression) motivational message board 200 and/or backing member 300 therein. Any or all of casing 120, motivational message board 200, and backing member 300 may have any of a variety of shapes, including, but not limited to, rectangular, square, round, circular, triangular, polygonal, freeform, oval, ovate, or any other shape or any combination thereof. Moreover, any or all of casing 120, motivational message board 200, and backing member 300 may be shaped and/or formed independently of the others, although it is understood that in some embodiments any or all may be shaped similar to any other. Furthermore, any or all of casing 120, motivational message board 200, and backing member 300 may have a predetermined size and/or shape that is based upon the size and/or shape of visor 50. For example, FIGS. 1 and 2 illustrate visor 50 as elongate and/or substantially rectangular, and the figures show casing 120, motivational message board 200, and backing member 300 as substantially elongate and/or similarly shaped to substantially match the shape of visor 50, while being somewhat undersized relative to visor 50.

Any of a variety of materials may be used to form any or all of the components of motivational display device 100. For example, motivational message board 200 may include a magnetic material, plastic, rubber, wood, metal, cardboard (e.g., corrugated), paper (e.g., corrugated), alloy, or any other material or any combination thereof. Backing member 300 may include, for example, a magnetic material, plastic, rubber, wood, metal, cardboard (e.g., corrugated), paper (e.g., corrugated), alloy, or any other material or any combination thereof. Casing 120 and/or any component thereof (e.g., rear casing member 130, frame 110, attachment members 150, 155, etc.) may be made of any of a variety of materials including, but not limited to, fabric, mesh or mesh-like material, sheet or sheet-like material, netting, plastic, rubber, wood, cardboard (e.g., corrugated), paper (e.g., corrugated), vinyl, or any other material or any combination thereof.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and embodiments have been presented for purposes of illustration. It is not intended to be exhaustive or to limit the precise steps and/or forms disclosed, and obviously many modifications and variations are possible in light of the above teaching. It is intended that the scope and all equivalents be defined by the claims appended hereto.

What is claimed is:

1. A display device for a sun visor, comprising:

a motivational message board having a predetermined size, said motivational message board having a front surface and a rear surface;

said front surface of said motivational message board having a viewable area;

a plurality of motivational images selectively and removably attachable to said viewable area of said motivational message board;

a casing for securably retaining said motivational message board, said motivational message board being removable from said casing;

said casing having a straight upper edge and a viewing window through which said viewable area of said motivational message board may be seen when said motivational message board is securably retained in said casing; and at least one attachment member connected to at least one of said casing and said motivational message board, said at least one attachment member removably attachable to said sun visor.

2. The display device of claim 1 wherein said casing includes a rear opening through which said motivational message board may be at least one of inserted into and removed from said casing.

3. The display device of claim 2 wherein said rear opening is closable and openable.

4. The display device of claim 3 wherein said rear opening is securably closable.

5. The display device of claim 1 wherein said casing includes a rear casing member disposable over at least a portion of said rear surface of said motivational message board.

6. The display device of claim 5 further comprising a backing member positioned between said rear surface of said motivational message board and said rear casing member.

7. The display device of claim 1 wherein said at least one attachment member includes a first strap and a second strap, said first strap removably attachable to said second strap to wrap around said sun visor.

8. The display device of claim 1 further comprising at least one additional attachment member, said at least one attachment member and said at least one additional attachment member disposed near opposite ends of said casing.

9. The display device of claim 1 wherein said at least one attachment member includes a stretchable strap for affixing said casing to said sun visor.

10. The display device of claim 1 wherein said at least one attachment member includes at least one bendable portion that is bendable at least partially around said sun visor.

11. The display device of claim 1 wherein said casing further includes a frame disposed over a portion of said front surface of said motivational message board adjacent an outer perimeter of said motivational message board, said frame substantially defining said viewing window.

12. The display device of claim 1 wherein said viewable area is substantially covered by a transparent screen.

13. The display device of claim 1 wherein said plurality of motivational images are removably attachable to said motivational message board by at least one of the following ways: magnetics, hook-and-loop fasteners, snaps, static, buttons, and adhesives.

14. A sun visor display device, comprising:

a motivational message board having a predetermined size based on said sun visor, said motivational message board having a front surface, a rear surface, and an outer perimeter;

a plurality of motivational images selectively and removably attachable to said motivational message board;

a casing for securably retaining said motivational message board wherein said motivational message board is configured to be received by said casing;

said casing having a straight upper edge defining a portion of a frame member positionable over said front surface of said motivational message board and adjacent said outer perimeter;

said frame member substantially defining a viewing window through which at least a viewable area of said motivational message board is viewable; and at least one attachment member connected to at least one of said casing and said motivational message board, said at least one attachment member removably attachable to the sun visor.

15. The sun visor display of claim 14 wherein said plurality of motivational images are removably attachable to said motivational message board by at least one of the following ways: magnetics, hook-and-loop fasteners, snaps, static, buttons, and adhesives.

16. The sun visor display device of claim 14 further comprising a backing member positioned between said rear surface of said motivational message board and said rear casing member.

17. The sun visor display device of claim 14 wherein said at least one attachment member includes at least one bendable portion that is bendable at least partially around said sun visor.

18. The sun visor display device of claim 14 wherein said at least one attachment member includes a first strap and a second strap, said first strap removably attachable to said second strap to wrap around said sun visor.

19. The sun visor display device of claim 14 wherein said at least one attachment member includes a stretchable strap affixable to said casing.

20. The sun visor display device of claim 14 wherein said viewable area is substantially covered by a substantially transparent screen.

* * * * *